United States Patent
Renken

(10) Patent No.: US 7,436,155 B2
(45) Date of Patent: Oct. 14, 2008

(54) CONTROL DEVICE FOR A THREE-PHASE MACHINE AND METHOD FOR OPERATING THE CONTROL DEVICE

(75) Inventor: Folker Renken, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 188 days.

(21) Appl. No.: 11/524,659

(22) Filed: Sep. 21, 2006

(65) Prior Publication Data
US 2007/0064459 A1    Mar. 22, 2007

(30) Foreign Application Priority Data
Sep. 21, 2005    (DE)    ............ 10 2005 045 122

(51) Int. Cl.
*G05F 1/70* (2006.01)
*H02M 7/538* (2007.01)
(52) U.S. Cl. ............... 323/207; 363/132
(58) Field of Classification Search ............ 363/39, 363/40, 95, 97, 98, 131, 132; 323/205, 207, 323/208, 209
See application file for complete search history.

(56) References Cited

U.S. PATENT DOCUMENTS

| | | | |
|---|---|---|---|
| 5,041,959 A * | 8/1991 | Walker | 363/79 |
| 5,329,222 A * | 7/1994 | Gyugyi et al. | 323/207 |
| 6,025,701 A * | 2/2000 | Weinhold | 323/207 |
| 6,459,601 B1 * | 10/2002 | Oba | 363/131 |

FOREIGN PATENT DOCUMENTS

EP    1 299 938 B1    4/2003

\* cited by examiner

*Primary Examiner*—Gary L Laxton
(74) *Attorney, Agent, or Firm*—Laurence A. Greenberg; Werner H. Stemer; Ralph E. Locher

(57) ABSTRACT

A control device for a three-phase machine contains an inverter, which can be connected on the input side to a direct voltage source and on the output side to the three-phase machine. The control device further has a reactive power converter, which on the output side is terminated by a capacitor and on the input side is disposed electrically parallel to the inverter, namely on the input side of the inverter.

10 Claims, 5 Drawing Sheets

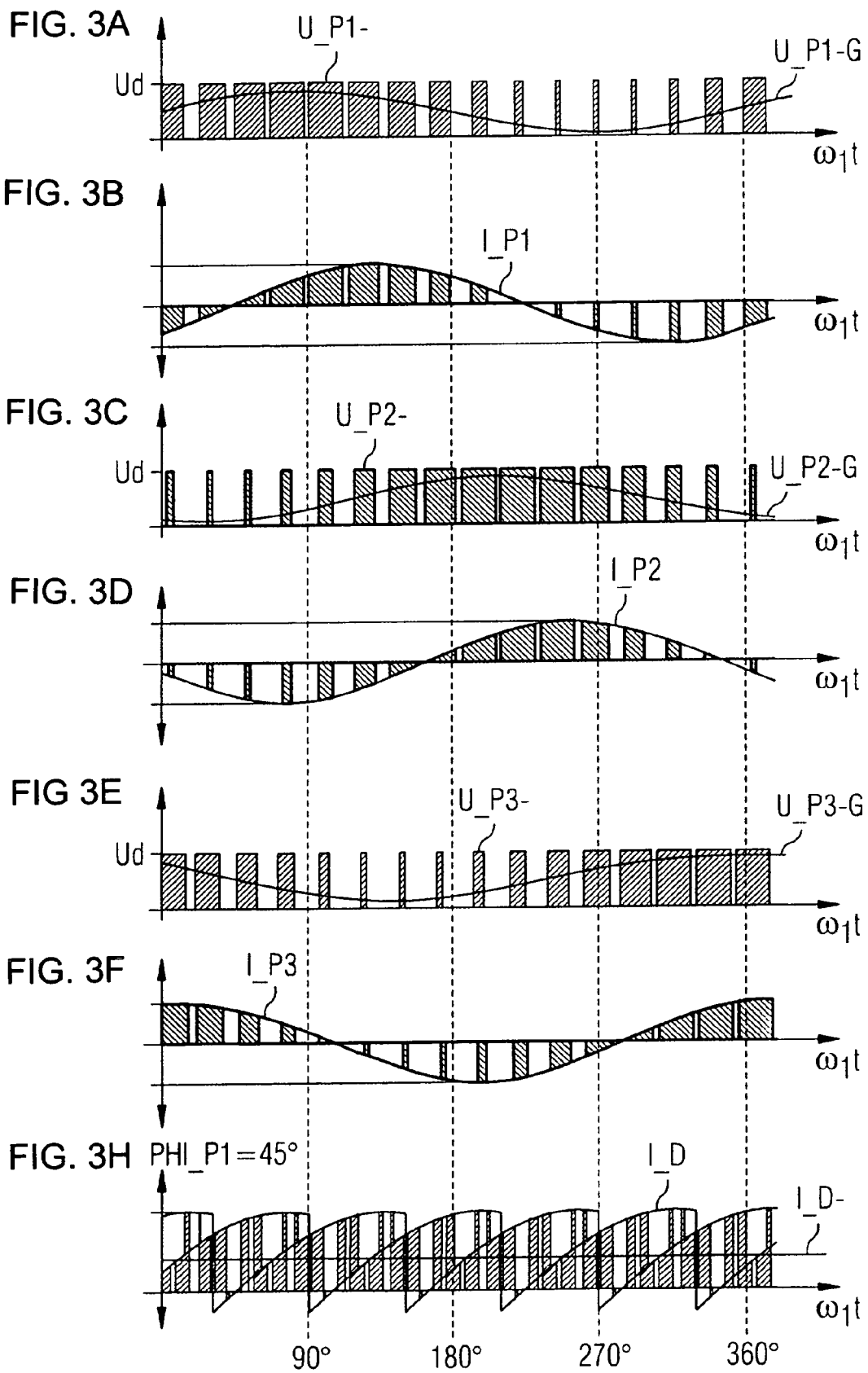

CONTROL DEVICE FOR A THREE-PHASE MACHINE AND METHOD FOR OPERATING THE CONTROL DEVICE

CROSS-REFERENCE TO THE RELATED APPLICATION

This application claims the priority, under 35 U.S.C. §119, of German application DE 10 2005 045 122.5, filed Sep. 21, 2005; the prior application is herewith incorporated by reference in its entirety.

BACKGROUND OF THE INVENTION

Field of the Invention

The invention relates to a control device for a three-phase machine and a method for operating the control device. Three-phase machines are used in particular to supply a vehicle electrical system in a generator mode of a motor vehicle and/or in an engine mode. Here, the so-called hybrid drive is increasingly gaining importance. In this case, besides an internal combustion engine the vehicle also has the three-phase machine for driving the vehicle. Components disposed in a motor vehicle have to be able to withstand extreme variations in temperature and have a long service life.

SUMMARY OF THE INVENTION

It is accordingly an object of the invention to provide a control device for a three-phase machine and a method for operating the control device that overcome the above-mentioned disadvantages of the prior art devices and methods of this general type, which allows reliable operation of the three-phase machine and is cost-effective. The object of the invention is further to provide a method for operating the control device for the three-phase machine that allows reliable operation of the internal combustion engine and is cost-effective.

With regard to a first aspect, the invention is characterized by a control device for a three-phase machine containing an inverter, which is connectable on the input side to a direct voltage source and on the output side to the three-phase machine. The control device further has a reactive power converter, which on the output side is terminated by a capacitor and on the input side is connected electrically parallel to the inverter, namely on the input side of the inverter. The reactive power converter, when suitably activated, may convert an alternating component of the input-side current of the inverter so that substantially only a direct current flows on the input side of the inverter. The alternating component of the input-side current of the inverter is an alternating component, which in the absence of the reactive power converter is present during operation of the control device. By use of the reactive power converter it is therefore easily possible to achieve the effect of dramatically reducing or entirely dispensing with the outlay for a voltage link with a capacitance that would be needed without a reactive power converter. This leads to a substantial cost saving because suitable capacitors push up the cost of the control device considerably.

In particular, this allows the use of a temperature-insensitive film capacitor for the voltage link. This is possible because the voltage link requires a low capacitance that is much smaller compared to a control device without a reactive power converter.

According to an advantageous development of the first aspect of the invention, there is associated with the control device at last one sensor, the measuring signal of which contributes towards determining the alternating component of the input-side current of the inverter without the presence of the reactive power converter. In this way, particularly precise activation of the reactive power converter for precise compensation of the alternating component is easily possible.

In this connection, it is particularly advantageous when the sensor is a phase current sensor that detects a phase current in a phase of the three-phase machine. It is further advantageous in this connection when the sensor is a direct voltage source sensor that detects the current through the direct voltage source.

According to a further advantageous development of the first aspect of the invention, the reactive power converter is a step-up converter. This has the advantage that across the output-side capacitor of the reactive power converter a higher voltage step is usable than across an optionally provided capacitor in the voltage link. This has the result that the capacitances of the capacitors may be set lower, thereby reducing the total outlay for the control device.

In this connection, it is particularly advantageous when the step-up converter is a polyphase step-up converter. This has the advantage that the individual phases of the step-up converter are activated with staggered timing and so, on the whole, a very high dynamic response of the step-up converter is possible, this allowing particularly precise compensation of the alternating component of the input-side current of the inverter. What is more, the currents may be apportioned to the individual branches of the step-up converter.

According to a further advantageous development of the first aspect of the invention, the reactive power converter is an inverting DC/DC converter. This has the advantage that the voltage, which drops above the capacitor, during operation may even become zero and so the voltage step across the capacitor may be set very high. In this connection, it is further advantageous when the inverting DC/DC converter is configured as a polyphase inverting DC/DC converter. The advantages in this regard correspond to the polyphase step-up converter.

According to a further advantageous development of the first aspect of the invention, the capacitor, which at the output side terminates the reactive power converter, is a film capacitor. This may be of a particularly cost-effective configuration because of a possible high voltage step on the output side of the reactive power converter and is less sensitive to temperature than an electrolytic capacitor.

According to a second aspect of the invention, the invention is characterized by a method of operating the control device, whereby an alternating component of the input-side current of the inverter is determined or defined without the presence of the reactive power converter and the reactive power converter is activated in the sense of a compensating of the alternating component of the input-side current of the inverter. The advantages correspond to the first aspect of the invention.

Other features which are considered as characteristic for the invention are set forth in the appended claims.

Although the invention is illustrated and described herein as embodied in a control device for a three-phase machine and a method for operating the control device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3A to 3F and 3H are graphs showing characteristics of currents or voltages;

DESCRIPTION OF THE PREFERRED EMBODIMENTS

Figure 1:
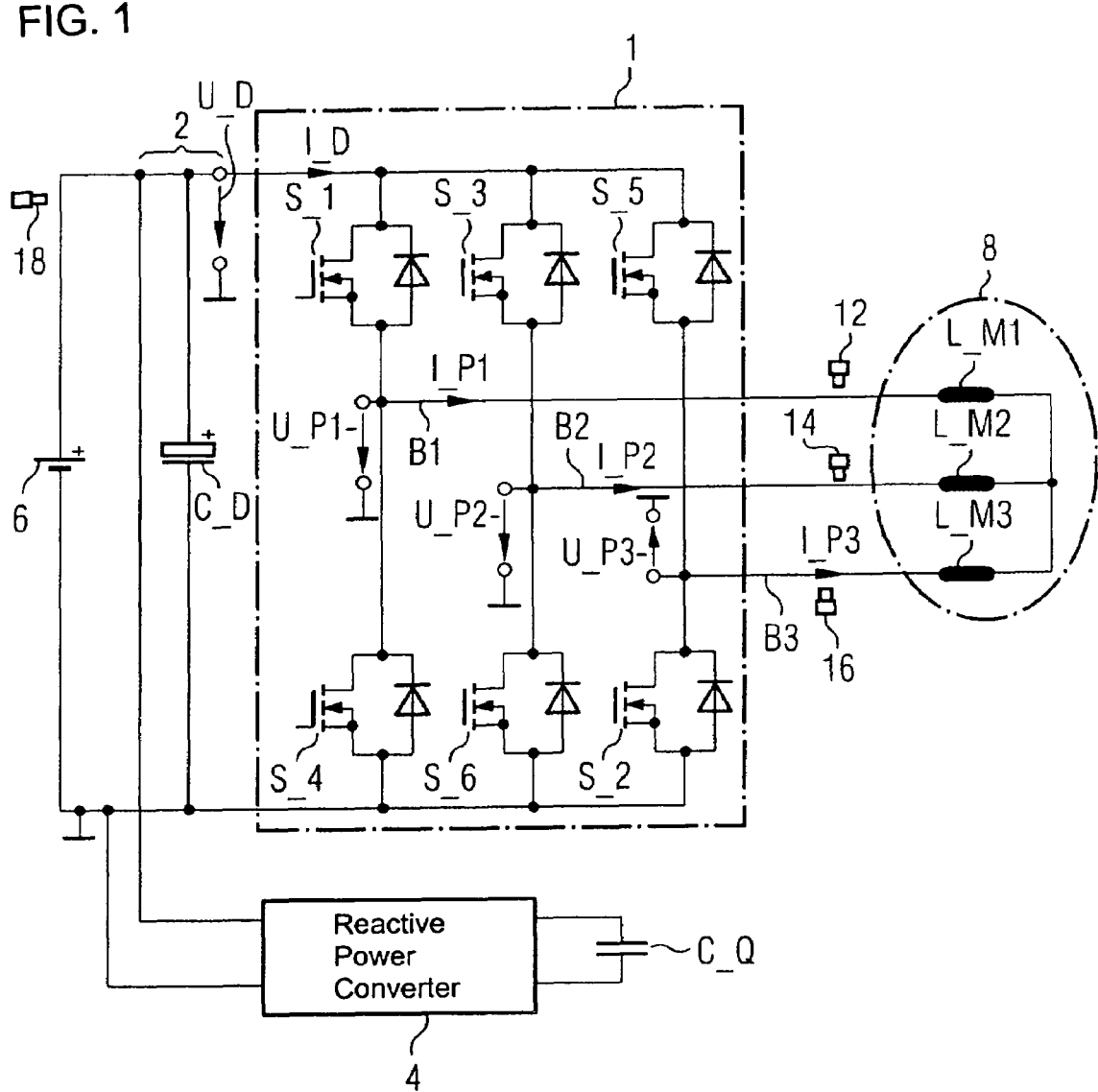
FIG. 1 is a schematic diagram of a control device for a three-phase machine according to the invention.

In all the figures of the drawing, sub-features and integral parts that correspond to one another bear the same reference symbol in each case. Referring now to the figures of the drawing in detail and first, particularly, to FIG. 1 thereof, there is shown a control device associated with a three-phase machine 8. The three-phase machine may be for example an asynchronous machine or a synchronous machine. The control device contains an inverter 1, a voltage link 2 and a reactive power converter 4. On an input side, for the operation of the control device, the inverter 1 is connected electrically to a direct voltage source 6, which may be for example a battery of a motor vehicle. The three-phase machine is preferably used in a motor vehicle. It may however also be used for any desired other application.

The inverter 1 includes first to third bridge branches B1 to B3 having switches S1, S3, S5 and S4, S6, S2 disposed at a high side and a low side respectively. Via the bridge branches B1 to B3 the three-phase machine is supplied in its respective phases. L_M1, L_M2 and L_M3 denote the inductances of the three-phase machine in the respective phases of the three-phase machine 8.

By a first tapping point, which is situated electrically between the switch S1 and the switch S4, the inverter 1 is connected on an output side to a first phase of the three-phase machine 8. In a corresponding manner, it is electrically connected by a second tapping point in the second bridge branch B2 to a second phase of the three-phase machine 8 and is likewise in a corresponding manner electrically connected by a third tapping point in the third bridge branch B3 to a third phase of the three-phase machine 8.

The switches S_1 to S_6 contain in each case parallel diodes.

The voltage link 2 contains a capacitor C_D, which is disposed electrically parallel to the direct voltage source 6. The reactive power converter 4 is disposed electrically parallel to the capacitor C_D of the voltage link. It is terminated on the output side by a capacitor C_Q. The reactive power converter 4 may also be described as a reactive current converter and may be a suitable DC/DC converter that is known to the person skilled in the art for these purposes. Preferably, it should have a fast timing rate in order to be able to compensate an alternating component of the input-side current of the inverter 1 as well as possible.

FIG. 3A shows a time characteristic of the voltage, in relation to a fundamental oscillation angle of the three-phase machine 8 and namely the voltage U_P1- in the first bridge branch B1 towards the load, i.e. the three-phase machine, in relation to the reference potential of the direct voltage source. When the voltage U_P1- in the first bridge branch towards the load equals a high-side input voltage U_D of the inverter 1, then the corresponding switch S_1 of the first bridge branch B1 situated at the high side is switched through and therefore becomes electrically conductive. Otherwise, the switch S4 at the low side of the first bridge branch B1 is switched through. The switches S1 and S4 of the first bridge branch B1 are therefore operated in each case in the mutually complementary position. By U_P1-G the sinusoidal fundamental oscillation characteristic resulting therefrom is denoted, in particular assuming an infinite clock frequency U_P1-G is the voltage characteristic of the mean value in the elementary periods.

FIG. 3B shows the characteristic—corresponding to FIG. 3A—of the phase current I_P1 in the first bridge branch B1 towards the first phase of the three-phase machine 8. In this case, the hatched blocks correspond in each case to the current through the switch S_1 and the spaces below the sinusoidal characteristic of the phase current I_P1 towards the first phase, which are not hatched, correspond to the respective current through the switch S4 disposed at the low side.

FIGS. 3C and 3E show the voltages U_P2- and U_P3-—corresponding to FIG. 3A—in the second and third bridge branch B2, B3 towards the load in relation to the direct voltage source reference potential and corresponding voltages U_P2-G and U_P3-G respectively. The activation of the switches S3, S5 situated at the high side and of the switches S_6, S_2 situated at the low side of the second and third bridge branches B2, B3 respectively corresponds to the already previously described activation of the switch S1 situated at the high side and of the switch S4 situated at the low side of the first bridge branch B1, wherein the offset in the phase control is evident from FIGS. 3C and 3E.

FIGS. 3D and 3F show corresponding second and third phase currents I_P2, I_P3, wherein here too the hatched regions towards the respective phase current I_P2, I_P3 denote the respective current flowing through the associated switch S_3 and/or S_5 situated at the high side, and the corresponding non-hatched regions denote the currents flowing towards the respective switch at the low side S6, S2 in the respective bridge branch B2, B3.

FIG. 3H shows the input current I_D at the high side of the inverter 1. It arises by adding the corresponding contributions represented by the hatched blocks in FIGS. 3B, 3D and 3F. FIG. 3H shows the input current I_D across the high side of the inverter 1 for a fundamental oscillation phase displacement PHI_P1 of 45°. FIGS. 4A to 4E show further characteristics of the input current I_D across the high side of the inverter 1 for various fundamental oscillation phase displacements PHI_P1, namely for 0°, for 45°, for 90°, for 135° and for 180°. I_D- denotes the respective direct component of the input current I_D at the high side of the inverter 1. In the case of the fundamental oscillation phase displacements smaller than 90°, the three-phase machine 8 is operated as an engine. For fundamental oscillation phase displacements PHI_P1 greater than 90°, it is operated as a generator.

The alternating component of the input current I_D at the high side of the inverter 1 arises from the difference of the input current I_D at the high side and the direct current component I_D-. The direct current component I_D- may flow via the direct voltage source 6. The alternative current component has to flow via the voltage link 2 and the reactive power converter 4 and/or be compensated. The corresponding current in relation to the input of the inverter 1 at the low side arises accordingly by corresponding addition of the currents through the switches S4, S6, S2 at the low side. It has in particular the opposite sign and the same magnitude when the arrow direction at the low side is also directed towards the capacitor C_D.

The reactive power converter 4 may be a suitable DC/DC converter known to the person skilled in the art and preferably has as fast a clock rate as possible in order to compensate as much as possible of the pulse-shaped alternating current component flowing on the input side of the inverter 1. For this purpose, the clock frequency of the reactive power converter 4 is preferably set much higher than that of the inverter 1.

Figure 2:
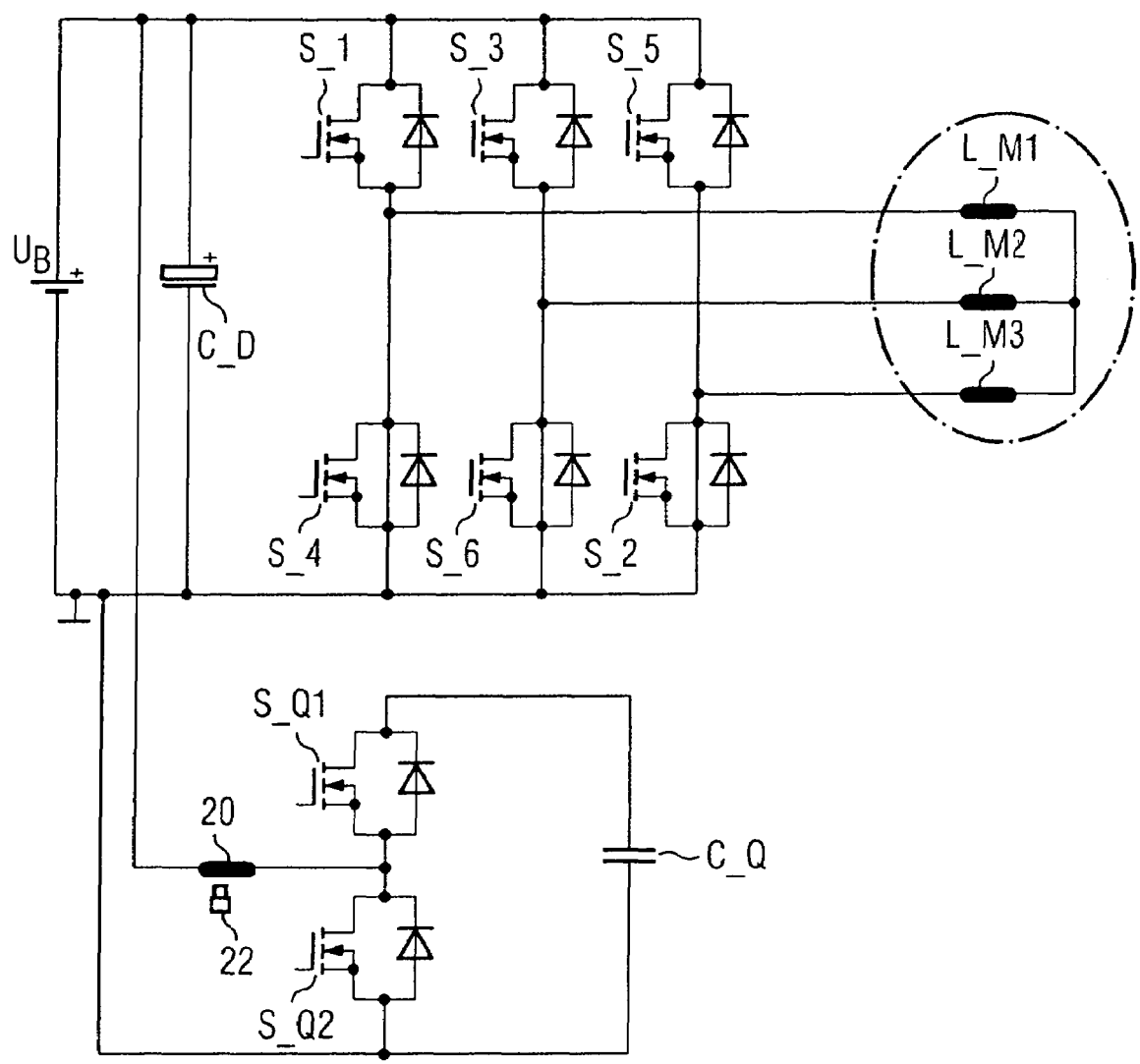
FIG. 2 is a schematic diagram of a first special embodiment of the control device according to FIG. 1.
Figure 4A:
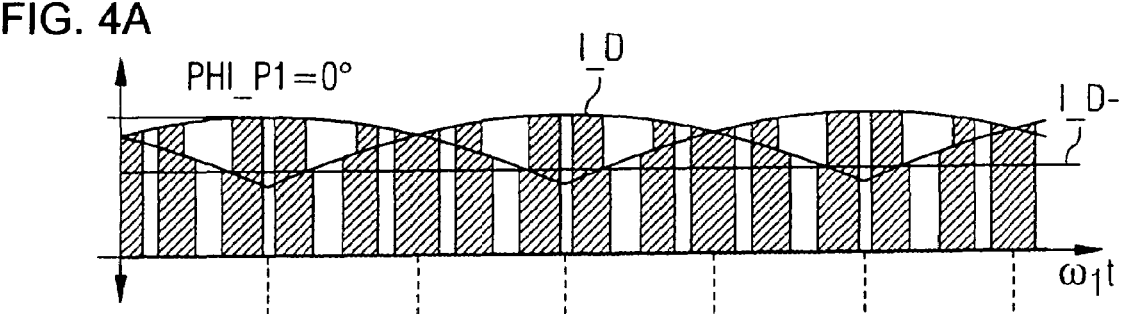
FIG. 4A to 4E are graphs showing time characteristics of an input-side current of an inverter for different fundamental phase displacements.
Figure 4B:
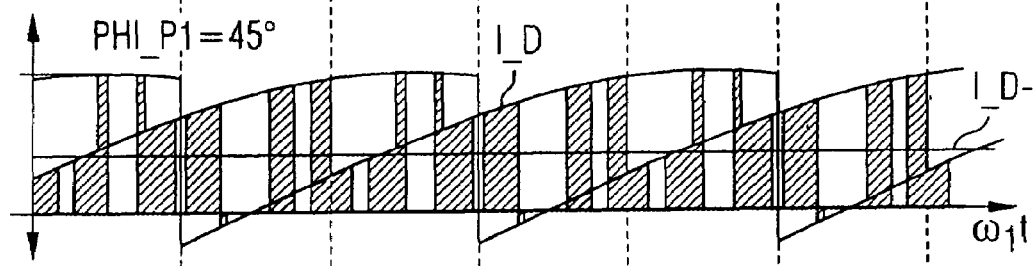
Figure 4C:
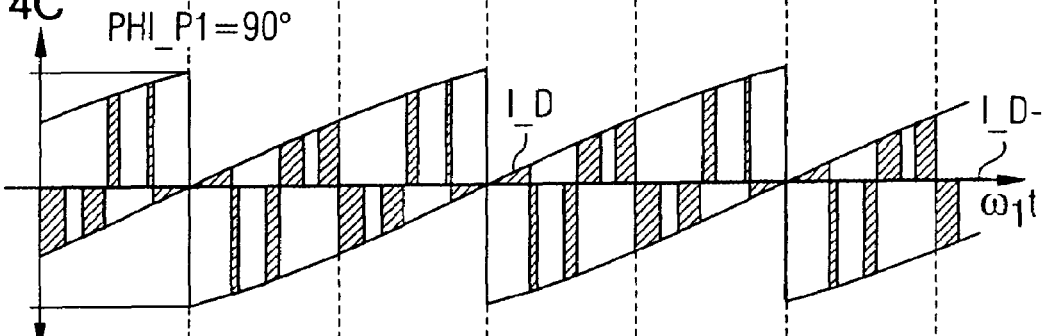
Figure 4D:
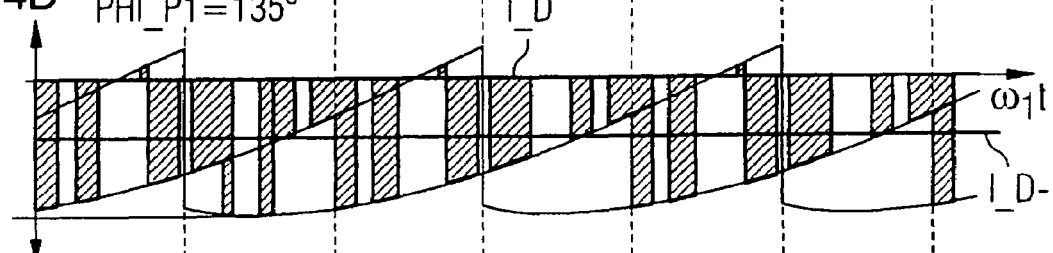
Figure 4E:
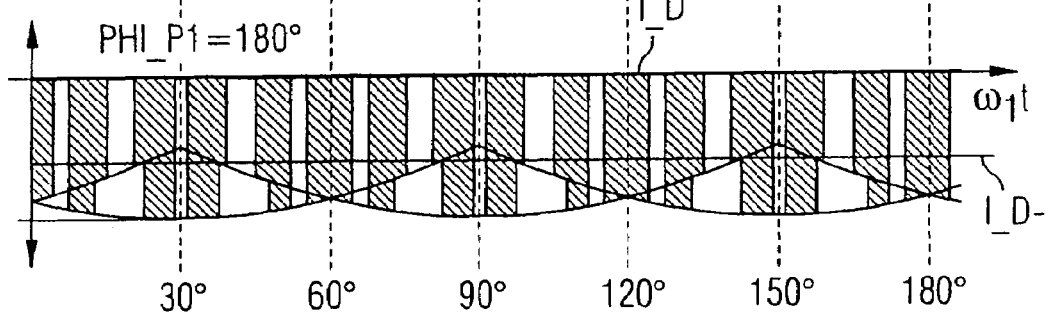

In FIG. 2 a first special form of construction of the control device is represented, wherein only the reactive power converter 4 that is represented in detail is described in detail below. The reactive power converter 4 is configured as a step-up converter. It contains on the input side a choke 20 and switches S_Q1 and S_Q2 disposed electrically in series relative to one another. The choke 20 is electrically connected on the one hand to the high-side input of the inverter 1 and on the other hand to a tapping point between the switches S_Q1 and S_Q2. Parallel to the switches S_Q1 and S_Q2 a capacitor C_Q is disposed on the output side of the reactive power converter 4.

The output voltage across the step-up converter, which corresponds to the voltage drop above the capacitor C_Q, is always higher than the voltage U_D, which is the high-side input voltage of the inverter but may also be referred to as the voltage link voltage. Given a voltage link voltage of e.g. 60 V and a maximum capacitor voltage across the capacitor C_Q of 120 V, it is therefore possible to use a voltage step of 60 V to compensate the alternating component of the input current I_D across the high side of the inverter 1 and/or across the low side thereof.

The reactive power converter may be activated by its switches S_Q1, S_Q2 to compensate the respective alternating component of the input-side current of the inverter without the presence of the reactive power converter 4. For this purpose, the input currents I_D that are valid for the in each case actual fundamental phase displacement PHI_P1 are determined at the high side and/or at the low side of the inverter 1 without the presence of the reactive power converter 4.

These characteristics of the input current U_D at the high side of the inverter 1 and/or at the low side of the inverter 1 may be permanently stored in a data memory of the control device for the respective fundamental oscillation phase displacements PHI_P1. Preferably, however, suitable sensors are provided, which each contribute towards determining the alternating component of the input-side current of the inverter without the presence of the reactive power converter 4. For this purpose, preferably phase current sensors 12, 14, 16 are provided, which detect the respective phase current I_P1, I_P2 and/or I_P3. Preferably, a direct voltage source sensor 18 is further provided, which detects the direct current component I_D-. These sensors are often provided anyway for other purposes and may therefore be used without any extra outlay to determine the alternating component of the input-side current of the inverter without the presence of the reactive power converter 4. The direct voltage source sensor 18 may also be described as a current sensor in the direct voltage source circuit or a current sensor on the direct voltage side.

To determine the input current I_D at the high side of the inverter 1, the phase currents I_P1, I_P2, I_P3 detected by the phase current sensors 12, 14, 16 are multiplied by respective values that are representative of the respective switching state of the associated switches S1, S3, S5 at the high side. Preferably, in the switched-through state the value one is taken for this purpose and in the non-switched-through state of the respective switch S1, S3, S5 a value zero. The phase currents I_PH1 to I_PH3 thus multiplied are then added, and the acquired direct current component I_D- is moreover subtracted from this total, the result then being the alternating component of the input current I_D across the high-side input of the inverter 1. The thus determined input current I_D at the high side of the inverter 1 is then multiplied by −1 and forms a setpoint value for the activation of the reactive power converter 4.

The switches S_Q1, S_Q2 of the reactive power converter 4 are then activated in the sense of a compensating of the alternating component of the input-side current of the inverter 1. Preferably, the current flowing through the choke 20 is further detected by a choke current sensor 22 and is used for control in the sense of minimizing its alternating component, namely by corresponding correction of the respective activation of the switches S_Q1, S_Q2 of the reactive power converter 4.

Figure 5:
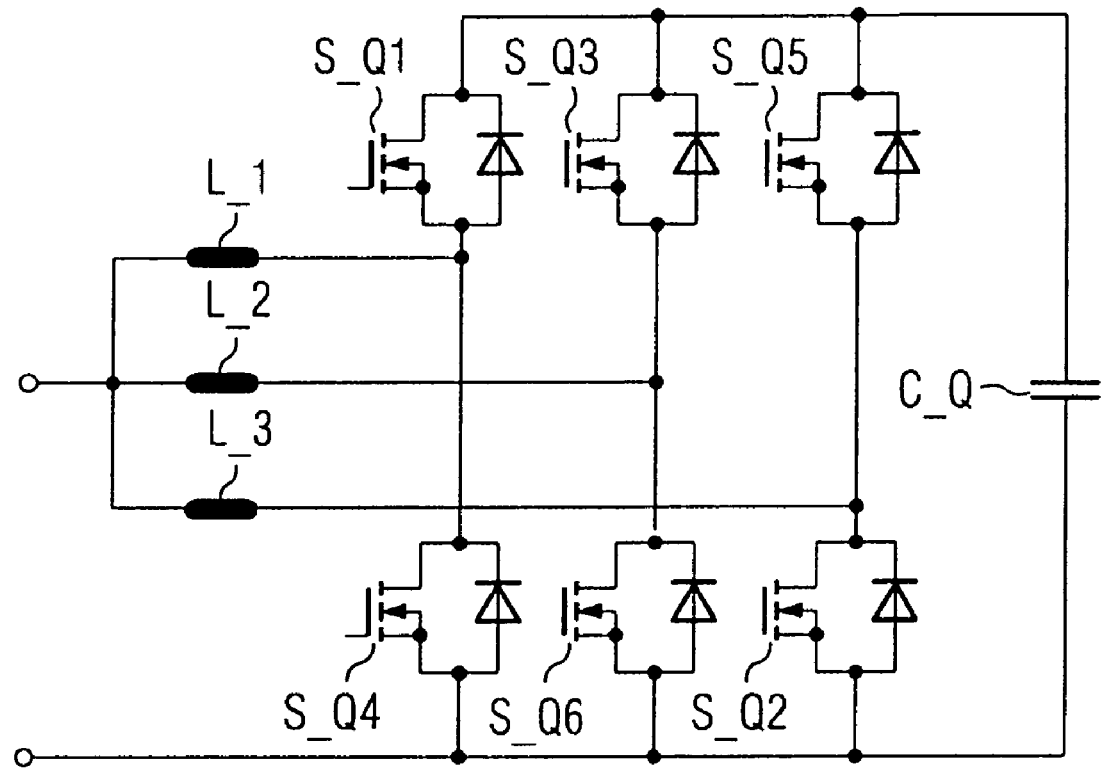
FIG. 5 is a schematic diagram of a further special embodiment of the control device according to FIG. 1, wherein only a reactive power converter is represented.

A particularly preferred form of construction of the step-up converter, which forms the reactive power converter 4, is represented in FIG. 5. In this form of construction, the reactive power converter 4 is configured as a polyphase step-up converter. It is configured for example as a three-phase step-up converter and contains three bridge branches, with which are associated upper and lower switches S_Q1, S_Q3, S_Q5 and S_Q4, S_Q6, S_Q2 respectively. By the upper switches are meant in each case the switches disposed at the high side, and by the lower switches are meant the switches disposed at the low side, i.e. at the lower potential in relation to the direct voltage potential.

The polyphase step-up converter 4 further contains the inductors L_1, L_2, L_3 associated with the respective bridge branches. By virtue of the increasingly polyphase nature of the step-up converter an increased dynamic response, in particular dynamic response of the control system may be achieved, for example in the case of the three-phase step-up converter a threefold dynamic response compared to the step-up converter according to FIG. 2 may be achieved, when in each case the maximum operating frequencies of the switches S_Q1, S_Q2 and/or S_Q1, S_Q4, S_Q3, S_Q6, S_Q5, S_Q2 is used. For this purpose, the polyphase step-up converter is preferably clocked in a staggered manner with regard to its phases, namely in each case by a third of the elementary period.

In this way, the outlay for the required capacitance, converted by the capacitors C_Q and/or C_D, may then be reduced, thereby reducing the cost of manufacture even further.

Figure 6:
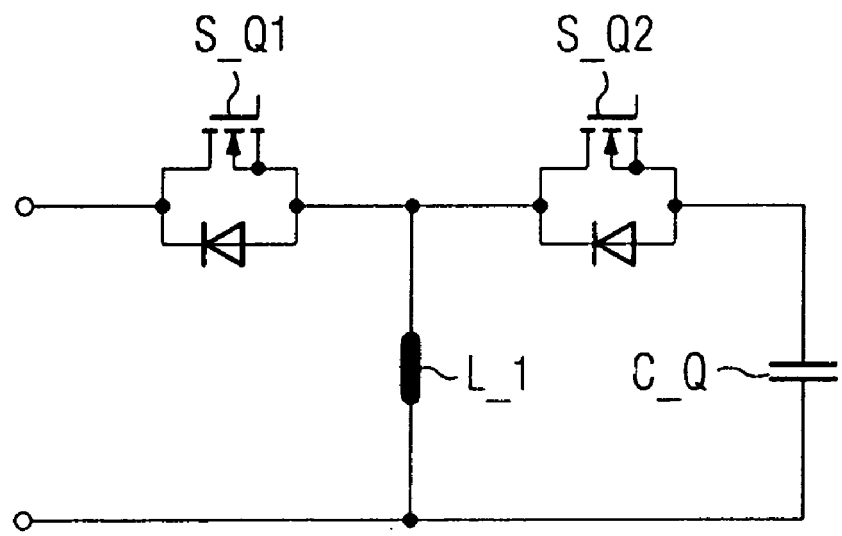
FIG. 6 is a schematic diagram of yet another special embodiment of the control device according to FIG. 1, wherein only the reactive power converter is represented.

A further preferred exemplary embodiment of the reactive power converter 4 is represented in FIG. 6. In this case, the reactive power converter 4 is configured as an inverting DC/DC converter having the inductor L_1 and the output-side capacitor C_Q and the switches S_Q1, S_Q2. In this case too, the reactive power converter may be of a polyphase configuration with corresponding advantages, as already explained above with regard to the reactive power converter 4 in the form of a polyphase step-up converter.

By use of the reactive power converter 4, the capacitor outlay in respect of the capacitors C_D and C_Q may be markedly reduced compared to the absence of the reactive power converter 4. In this case, the capacitors C_D, C_Q may also be formed in each case by a plurality of individual capacitors. Through the use of the reactive power converter 4 the necessary capacitance and the current loading of the capacitor C_D may be markedly reduced, it being ideally possible even to dispense entirely with the capacitor C_D. This moreover allows the optional use of film capacitors instead of electrolytic capacitors. In a preferred manner, it is therefore possible to use film capacitors also for the capacitor C_Q. The provision of the reactive power converter therefore makes it possible for example markedly to reduce the expenditure for the capacitors C_D and/or C_Q, which otherwise make up a considerable proportion of the cost for the entire control device.

Electrolytic capacitors, in particular aluminum electrolytic capacitors are preferably used in the voltage link 2 in control devices without the reactive power converter 4 preferably with low operating voltages, i.e. markedly below 400 V. It is only with higher voltages of the direct voltage source that are greater than 400 V that film capacitors are preferred. The cost of both electrolytic and film capacitors is considerable. Design criteria for the capacitors are, on the one hand, the permissible current loading, which as a rule determines the capacitor outlay for electrolytic capacitors, as well as the permissible voltage variation across the input of the inverter, which as a rule determines the capacitor outlay for film capacitors.

The reactive power converter 4 may also be configured in other suitable ways, for example as an oscillation circuit inverter or as a soft-switching converter, in which the semiconductors switch either at the voltage zero or at the current zero, this also being referred to as zero switching or zero current switching. Very low switching losses are thereby achievable.

I claim:

1. A control device for a three-phase machine, the control device comprising:
   an inverter having an input side for connecting to a direct voltage source and an output side for connecting to the three-phase machine;
   a capacitor; and
   a reactive power converter having an output side terminated by said capacitor and an input side connected electrically parallel to said input side of said inverter.

2. The control device according to claim 1, further comprising at least one sensor outputting a measuring signal which contributes towards determining an alternating component of an input-side current of said inverter without a presence of said reactive power converter.

3. The control device according to claim 2, wherein said sensor is a phase current sensor for detecting a phase current in a phase of the three-phase machine.

4. The control device according to claim 2, wherein said sensor is a direct voltage source sensor for detecting a current of the direct voltage source.

5. The control device according to claim 1, wherein said reactive power converter is a step-up converter.

6. The control device according to claim 5, wherein said step-up converter is a polyphase step-up converter.

7. The control device according to claim 1, wherein said reactive power converter is an inverting DC/DC converter.

8. The control device according to claim 7, wherein said inverting DC/DC converter is a polyphase inverting DC/DC converter.

9. The control device according to claim 1, wherein said capacitor is a film capacitor.

10. A method for operating a control device of a three-phase machine, the control device containing an inverter having an input side for connecting to a direct voltage source and an output side for connecting to the three-phase machine, a capacitor, and a reactive power converter having an output side terminated by the capacitor and an input side connected electrically parallel to the input side of the inverter, which comprises the steps of:
   determining or predetermining an alternating component of an input-side current of the inverter without a presence of the reactive power converter; and
   activating the reactive power converter for compensating for the alternating component of the input-side current of the inverter.

* * * * *